May 26, 1959     C. HUDKINS     2,887,816
FISHING BOBBER
Filed April 2, 1956
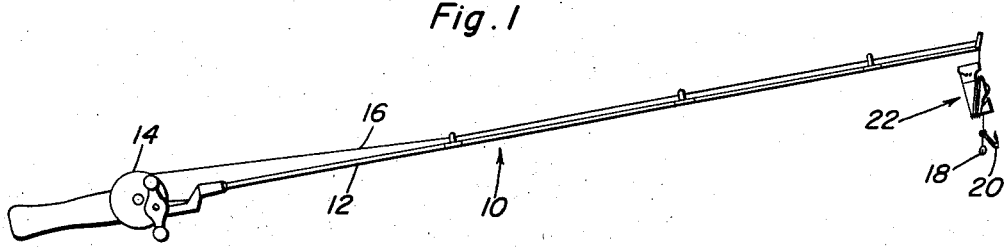
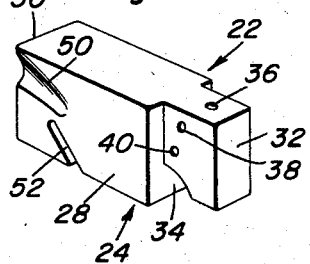
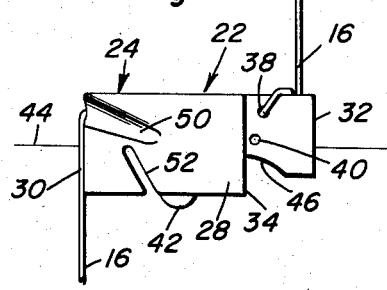
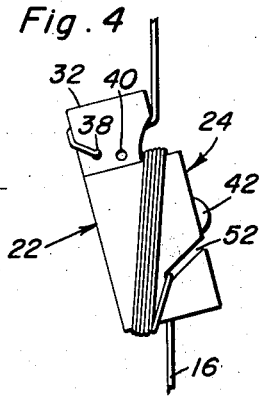
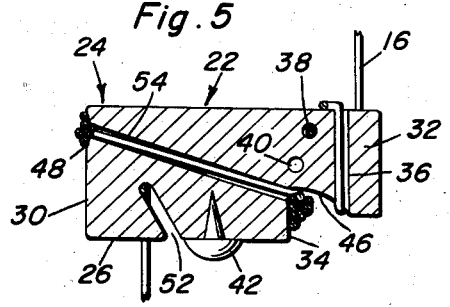
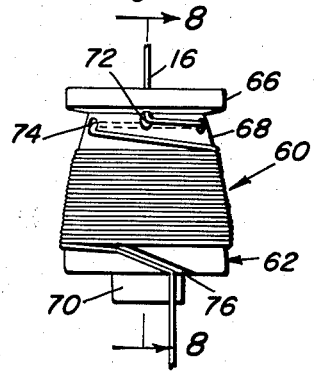
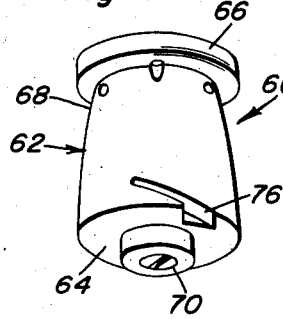
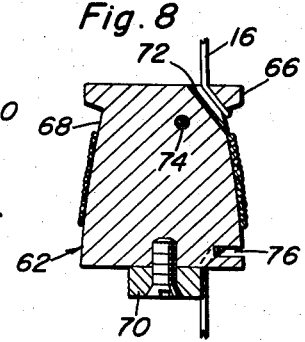
Clyde Hudkins
INVENTOR.
BY *Clarence A. O'Brien*
*and Harvey B. Jacobson*
Attorneys ns patent office 2,887,816
Patented May 26, 1959

2,887,816

FISHING BOBBER

Clyde Hudkins, Wheeling, W. Va.

Application April 2, 1956, Serial No. 575,392

4 Claims. (Cl. 43—43.11)

This invention relates in general to new and useful improvements in fishing equipment, and more specifically to an improved fishing bobber.

In many types of fishing it is desirous to use a bobber or float primarily for the purpose of maintaining the hook a desired distance below the surface of the water. However, because it is necessary that the bobber be positioned on the fishing line a distance from the hook and weight of such line, when the fishing line is reeled in the bobber bears against the end of the rod and a large quantity of the line and the hook and weight extend therefrom thereby making casting very difficult, particularly in crowded spaces. It is therefore the primary object of this invention to provide an improved fishing bobber which is so constructed whereby that portion of the fishing line which extends beyond the bobber may be conveniently wound thereon and cast out together with the bobber, the bobber being so constructed whereby the fishing line is automatically released therefrom upon the settling of the bobber in the water.

Another object of this invention is to provide an improved fishing bobber which is so constructed whereby it may be quickly and easily positioned on a fishing line at any desired distance from the hook end of the line and be frictionally maintained thereon so that by merely sliding the bobber along the fishing line to the desired position, it will be retained in that position.

Yet another object of this invention is to provide an improved fishing bobber having means thereon for temporarily retaining a fishing line end thereon during casting and other means for frictionally retaining fishing lines with respect to the bobber, the means being of such a nature whereby lines of various sizes may be used with a single type of bobber and the desired friction maintained.

A further object of this invention is to provide an improved fishing line bobber which is so constructed whereby it may be selectively used for maintaining a hook at a desired distance from the surface of the water and which may be used in casting the hook and the part of the fishing line disposed between the hook and the bobber and at the same time may be selectively mounted on a fishing line so that the bobber will form an anchor point for the fishing line while bottom fishing.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a fishing rod and reel with the fishing line thereof being equipped with the bobber which is the subject of this invention;

Figure 2 is an enlarged rotated perspective view of the bobber of Figure 1 and shows the general details thereof when removed from the fishing line;

Figure 3 is an enlarged side elevational view of the bobber of Figure 1 and shows the bobber positioned on a fishing line and floating on the surface of the water in actual use;

Figure 4 is an enlarged elevational view of the bobber of Figure 1 as it appears with the fishing line wound thereon immediately prior to casting;

Figure 5 is an enlarged longitudinal vertical sectional view taken through the fishing bobber in its position of Figure 3 and shows further the details thereof;

Figure 6 is a perspective view of a modified form of fishing bobber;

Figure 7 is an elevational view of the fishing bobber of Figure 6 and shows the same with the fishing line wound thereon prior to casting; and Figure 8 is a vertical sectional view taken substantially upon the plane indicated by the section line 8—8 of Figure 7 and shows further the details of the fishing bobber of Figure 6.

Referring now to the drawings in detail, it will be seen that there is illustrated in Figure 1 fishing equipment which is referred to in general by the reference numeral 10. The fishing equipment 10 includes a fishing rod 12 having mounted thereon a fishing reel 14. Suitably reeled on the fishing reel 14 is a fishing line 16 which extends along the rod 12. Mounted on the extreme end of the fishing line 16 is a weight 18. A suitable hook 20 is positioned adjacent the weight 18. Disposed intermediate the ends of the fishing line 16 and a predetermined distance from the hook 20 is a bobber, the bobber being referred to in general by the reference numeral 22 and being the subject of this invention.

As is best illustrated in Figures 2, 3, 4 and 5 the bobber 22 includes a horizontally elongated body which is referred to in general by the reference numeral 24. The body 24 is generally rectangular in cross section, although it may be circular, oblong or other configurations, and includes a bottom 26, sides 28 and an end 30. Disposed at the opposite end of the body 24 from the end 30 is a reduced handle 32 which results in the formation of a shoulder 34.

In order to facilitate the selective positioning of the bobber 22 on the fishing line 16, the handle 32 is provided with a plurality of apertures including a vertical aperture 36 and a pair of transverse apertures 38 and 40. Additional transverse apertures may be provided if deemed necessary.

In order that the bobber 22 may float in an upright horizontal position, such as that illustrated in Figure 3, there is secured to the bottom 26 a suitable weight 42. The combined weight of the body 24 and the weight 42 is such that the bobber 22 will float in water, such as the water 44, with a large part of the body 24 projecting above the surface of the water 44.

The purpose of the bobber 22 is primarily that of maintaining the hook 20 a predetermined distance below the surface of the water 44. As a result, there is a certain portion of the fishing line 16 which is disposed between the bobber 22 and the hook 20. In order to facilitate casting of the bobber 22, the hook 20 and the weight 18, a majority of the fishing line 16 disposed between the hook 20 and the bobber 22 is intended to be wound upon the bobber 22. A major part of this portion of the fishing line 16 is wound about the body 24 substantially horizontally around the sides 28, the end 30 and the shoulder 34. It is to be noted that the underside of the handle 32 is undercut as at 46 to facilitate the positioning of the fishing line 16. Further, there is formed in the upper part of the end 30 a recess 48 which intersects diagonal recesses 50 in the sides 28, the recesses 50 extending towards the shoulder 34 beneath the handle 32.

In addition to the recesses 48 and 50, there is cut in the bottom part of the body 24 a slot or notch 52. The slot 52 extends diagonally upwardly toward the recesses 50 and the recess 48.

In addition to the apertures 36, 38 and 40 there is provided an elongated diagonal aperture 54 which extends from the end 30 in the vicinity of the recess 48 to the upper part of the shoulder 34 immediately beneath the handle 32. Normally the fishing line 16 is threaded upwardly through the aperture 36 and transversely through at least the aperture 38. The fishing line 16 is then threaded through the aperture 54 so that it exits in the recess 48. The portion of the fishing line 16 below the bobber 22 is primarily wound in the recesses 48 and 50 and on the end 30 and the shoulder 34. A small amount of the fishing line 16 is wound around the lower corner of the body 24, the fishing line being received in the recess 48 and in the slot 52.

Referring now to Figure 4 in particular, it will be seen that when the bobber 22 is in a position to be cast, that part of the fishing line 16 which is disposed adjacent the hook 20 extends through the notch or slot 52 and hangs down therefrom. Thus when the bobber 22 is being cast, the depending portion of the fishing line 16 will extend away from the bobber 22 due to the weight 18 and will be retained in the notch or slot 52 at all times. However, when the fishing bobber 22 comes to rest on the surface of the water 44, it will be in a horizontal position and the fishing line will immediately unwind off of the body 24 so that it assumes a vertical position alongside the end 30.

The purpose of the various apertures in the handle 32 is so that the fishing line 16 may be frictionally bound with respect to the bobber 22. It is to be understood that the bobber 22 will be used with different sizes of lines and that the friction will depend to a large degree on the size of the line and the type of line used. Therefore, the number of turns which the line 16 must make with respect to the handle 32 will vary upon the different line used and the different degree of friction desired.

Although a bobber is not generally utilized when bottom fishing, the bobber 22 may be so utilized to advantage. By threading the fishing line 16 downwardly through the aperture 36, and winding it upon the body 24 in the manner described above, but not passing it through the aperture 54, the fishing line 16 together with the weight 18 and the hook 20 may be cast the desired distance using the bobber 22. The fishing line 16 will then freely pass through the bobber 22 so that the hook 20 will be at the bottom. When it is desired to retrieve the fishing line 16, the pull on it will result in direct upward movement of the hook 20 thereby preventing the hook 20 from being tangled with debris on the bottom. Inasmuch as the fishing line 16 freely passes through the bobber 22, the bobber 22 will not in any way hinder the playing and retrieving of the fish even after the bobber strikes the end of a rod.

If it is desired to place the bobber 22 on the fishing line 16 without first removing the hook 20 and the weight 18, the fishing line 16 may be doubled at the desired point and passed through the aperture 36 only. The fishing line 16 will then be looped about the handle 32. By pulling on the desired end of the fishing line 16, the position of the bobber 22 may be shifted.

It is pointed out at this time that the primary purpose of the handle 32 being shaped as is best illustrated in Figure 2 is to facilitate the gripping of the bobber 22 so that it may be held in the proper position for the winding of the fishing line 16 thereon.

Referring now to Figures 6, 7 and 8 in particular, it will be seen that there is illustrated a modified form of bobber which is referred to in general by the reference numeral 60. The bobber 60 includes a generally cylindrical body 62 having a bottom 64 and a capped type upper end 66. The intermediate portion of the body 62 is reduced to form an annular recess 68 to facilitate the winding of the fishing line 16 thereon. In order that the bobber 60 may sit in an upright position, there is suitably secured to the bottom 64 a weight 70.

The capped portion 66 is provided with an upwardly sloping aperture 72 which opens into the upper part of the recess 68. At least one transverse aperture 74 extends through the upper portion of the body 62 with opposite ends thereof opening into the recess 68. The fishing line 16 is threaded downwardly through the aperture 72 and transversely through the aperture 74. That portion of the fishing line 16 disposed between the bobber 60 and the hook 20 is then wound about the body 62 in the vicinity of the recess.

The lower part of the body 62 is provided with a diagonal slot or notch 76 which opens through the bottom 64. The lower end of the fishing line 16 in the vicinity of the hook 20 passes downwardly through the slot 76 and is retained therein during casting. However, when the bobber 60 comes to rest on the surface of the body of water, such as the water 44, and retains its upright position due to the weight 70, the fishing line 16 will pass out of the slot 76 and will unwind from about the body 62 so that the hook 20 may be positioned at the desired depth.

Although one transverse aperture 74 has been illustrated, additional apertures may be provided so that the desired friction between the bobber 60 and the fishing line 16 may be obtained. Thus the bobber 60 may be frictionally positioned at any desired point along the fishing line 16.

It is primarily intended that the bobbers 22 and 60 be solid and formed of wood or other light weight material. However, if desired, they may be formed in a hollow state and of a suitable plastic or other material. Also, the bobbers 22 and 60 will be painted desired colors to readily detect movement thereof to indicate that there is a bite on the hook 20.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A fishing bobber comprising a floatable body, a weight at the bottom of said body to effect flotation of said body in an upright position, a reduced handle at one end of said body, said handle terminating above said bottom to form a fishing line engaging shoulder, a line receiving recess in the opposite end and sides of said body, said recess extending towards said shoulder, a diagonal slot in the lower portion of said body and opening through said bottom to retain a fishing line wound on said body while being cast, and means on said handle for frictionally positioning said body on a fishing line.

2. A fishing bobber comprising a floatable body, a weight at the bottom of said body to effect flotation of said body in an upright position, a reduced handle at one end of said body, said handle terminating above said bottom to form a fishing line engaging shoulder, a line receiving recess in the opposite end and sides of said body, said recess extending towards said shoulder, a diagonal slot in the lower portion of said body and opening through said bottom to retain a fishing line wound on said body while being cast, and means on said handle for frictionally positioning said body on a fishing line, said means including a plurality of apertures for interlacingly receiving a fishing line.

3. A fishing bobber comprising a floatable body, a weight at the bottom of said body to effect flotation of said body in an upright position, a reduced handle at one end of said body, said handle terminating above said bottom to form a fishing line engaging shoulder, a line receiving recess in the opposite end and sides of said body, said recess extending towards said shoulder, a diagonal slot in the lower portion of said body and opening through said bottom to retain a fishing line wound on said body while being cast, and means on said handle for frictionally positioning said body on a fishing line, said means including a plurality of apertures for interlacingly receiving a fishing line, said apertures including a vertical aperture whereby said body may be freely positioned on a fishing line for bottom fishing.

4. A fishing bobber comprising a floatable body, a weight at the bottom of said body to effect flotation of said body in an upright position, a reduced handle at one end of said body, said handle terminating above said bottom to form a fishing line engaging shoulder, a line receiving recess in the opposite end and sides of said body, said recess extending towards said shoulder, a diagonal slot in the lower portion of said body and opening through said bottom to retain a fishing line wound on said body while being cast, and means on said handle for frictionally positioning said body on a fishing line, said means including a plurality of apertures for interlacingly receiving a fishing line, said apertures including a diagonal aperture aligned with said recess and extending through said body from said opposite end to said shoulder.

References Cited in the file of this patent

UNITED STATES PATENTS

| | | |
|---|---|---|
| 261,505 | Wilson | July 18, 1882 |
| 1,512,656 | Ward | Oct. 21, 1924 |
| 2,592,441 | Louthan | Apr. 8, 1952 |
| 2,712,197 | Lewis | July 5, 1955 |
| 2,720,720 | Landrum | Oct. 18, 1955 |
| 2,775,056 | Sneed | Dec. 25, 1956 |